United States Patent
Su et al.

(10) Patent No.: US 10,461,865 B2
(45) Date of Patent: Oct. 29, 2019

(54) CONTAINING DEVICE OF OPTICAL TRANSCEIVER

(71) Applicant: Delta Networks, Inc., Taoyuan (TW)

(72) Inventors: Yuh-Chu Su, Taoyuan (TW);
Shu-Hong Chu, Taoyuan (TW)

(73) Assignee: Delta Networks, Inc., Taoyuan (TW)

( * ) Notice: Subject to any disclaimer, the term of this patent is extended or adjusted under 35 U.S.C. 154(b) by 0 days.

(21) Appl. No.: 15/959,909

(22) Filed: Apr. 23, 2018

(65) Prior Publication Data
US 2019/0149237 A1    May 16, 2019

(30) Foreign Application Priority Data

Nov. 10, 2017   (CN) .......................... 2017 1 1105417

(51) Int. Cl.
*H04B 10/40*   (2013.01)
*G02B 6/42*    (2006.01)

(52) U.S. Cl.
CPC ........... *H04B 10/40* (2013.01); *G02B 6/4284* (2013.01); *G02B 6/4285* (2013.01)

(58) Field of Classification Search
CPC .. H04B 10/40; H04B 10/801; H04B 10/1143; G02B 6/4246; G02B 6/4292; G02B 6/4284; G02B 6/4285
See application file for complete search history.

(56) References Cited

U.S. PATENT DOCUMENTS

| | | | |
|---|---|---|---|
| 7,396,166 B1* | 7/2008 | Chou | G02B 6/4201 385/14 |
| 2003/0042824 A1* | 3/2003 | Coffin | G11B 15/6835 312/223.2 |
| 2005/0018976 A1* | 1/2005 | Lee | G02B 6/4292 385/88 |
| 2006/0198098 A1* | 9/2006 | Clark | H05K 7/1425 361/679.01 |

FOREIGN PATENT DOCUMENTS

CN    102201870 A    9/2011

* cited by examiner

*Primary Examiner* — Ted M Wang
(74) *Attorney, Agent, or Firm* — Muncy, Geissler, Olds & Lowe, P.C.

(57) ABSTRACT

A containing device for affixing a plurality of optical transceivers is provided, wherein each of the optical transceivers includes a first surface and a second surface opposite to the first surface. The containing device includes a housing and a passage formed in the housing. The passage has a first abutting surface and a second abutting surface. The optical transceivers are disposed in the passage. When the containing device moves along a first direction relative to the optical transceivers, the first abutting surface contacts the first surfaces of the optical transceivers. When the containing device moves along a second direction relative to the optical transceivers, the second abutting surface contacts the second surfaces of the optical transceivers, wherein the first direction is opposite to the second direction.

9 Claims, 11 Drawing Sheets

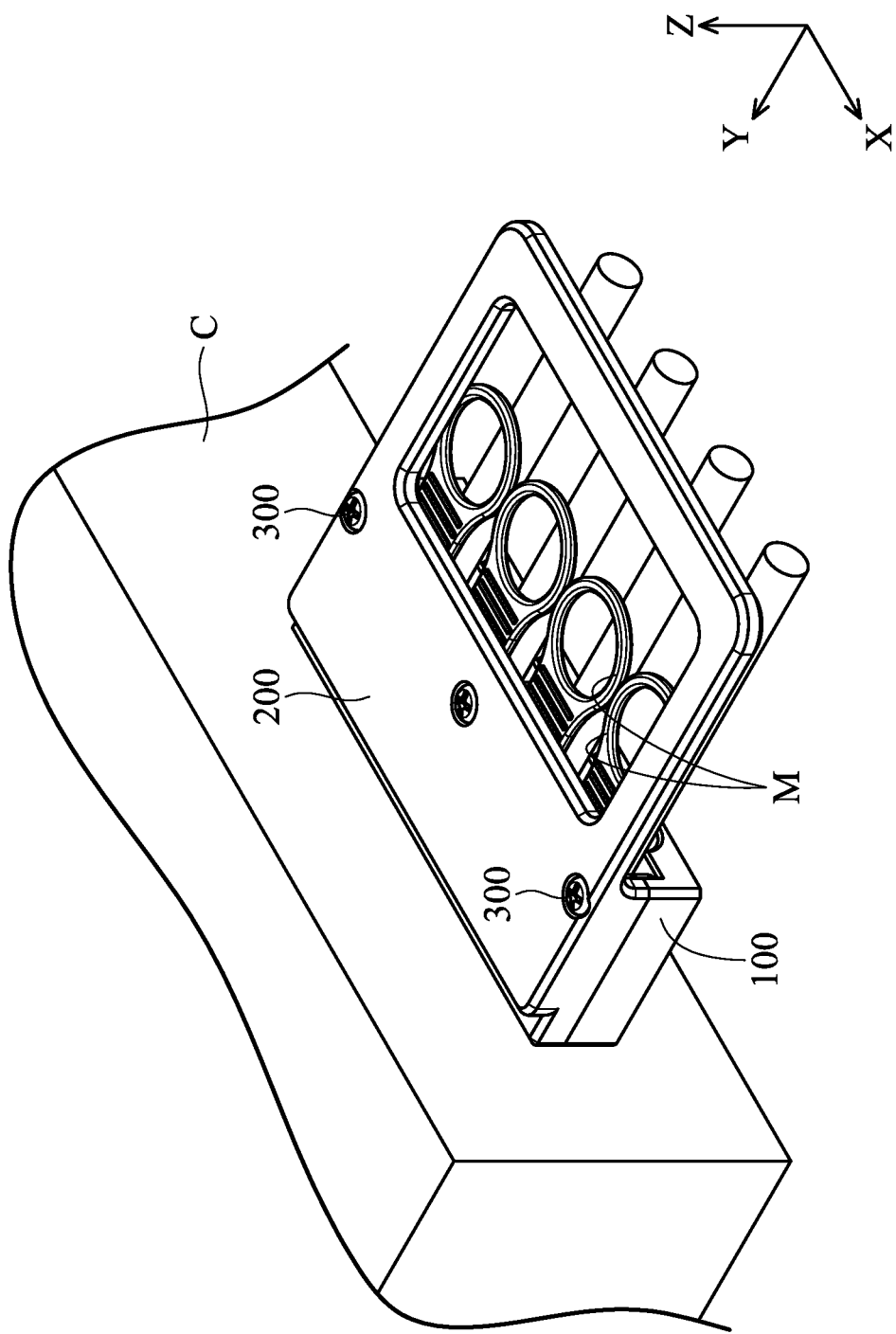

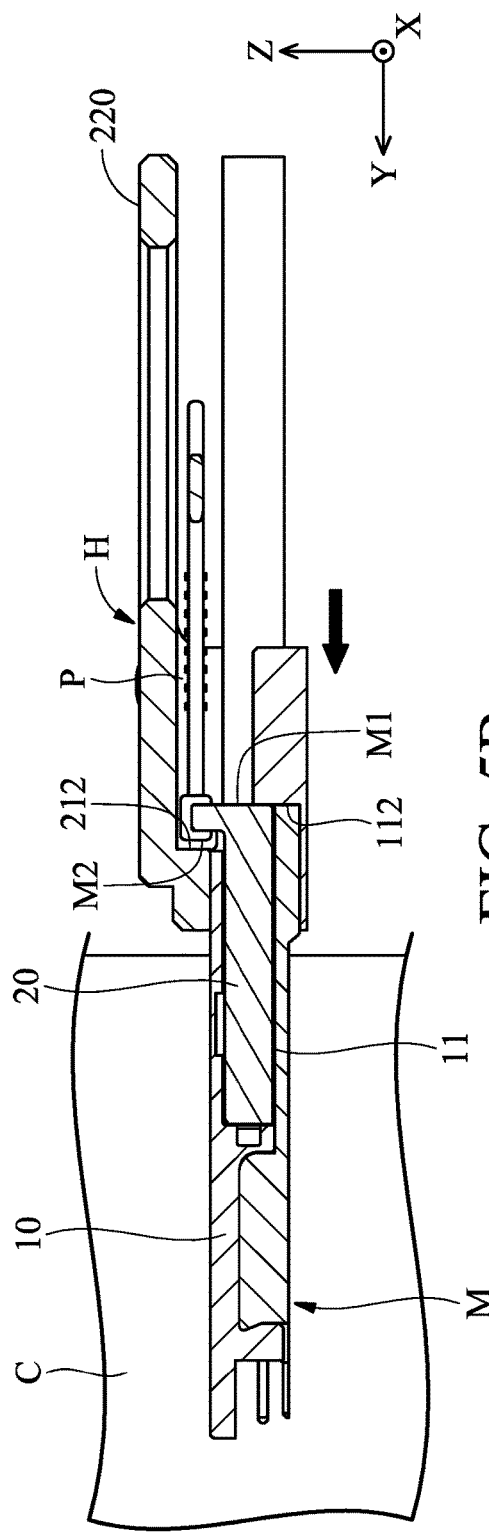
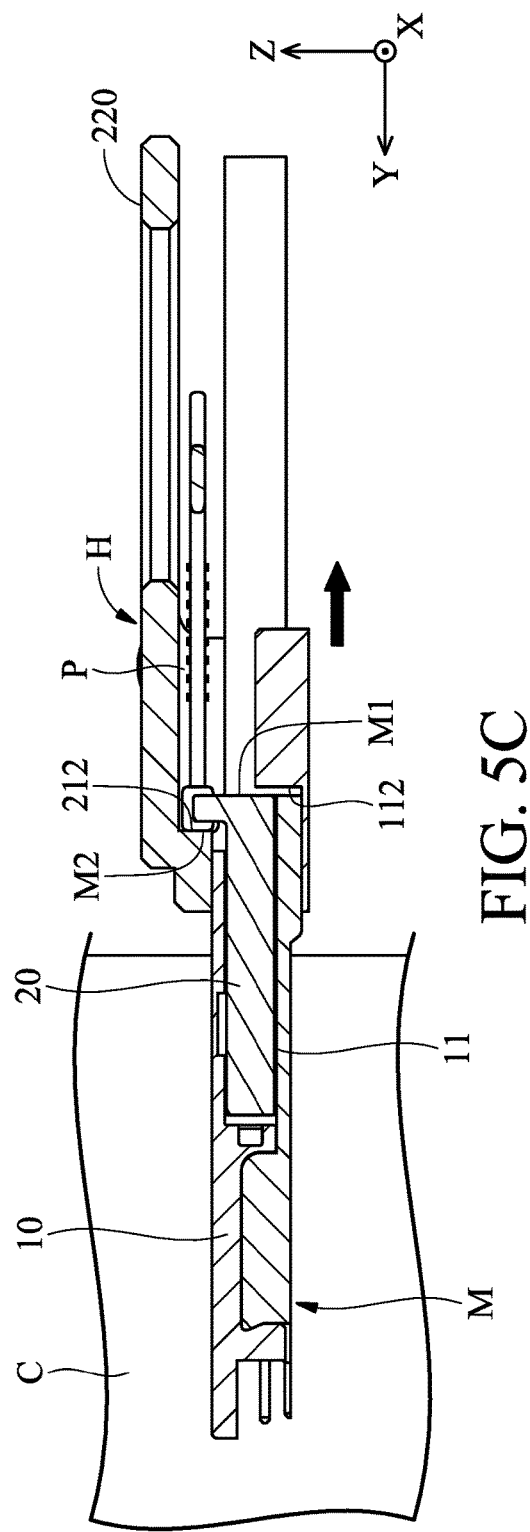

CONTAINING DEVICE OF OPTICAL TRANSCEIVER

CROSS REFERENCE TO RELATED APPLICATIONS

This application claims the benefit of China Patent Application No. 201711105417.4, filed Nov. 10, 2017, the entirety of which are incorporated by reference herein.

BACKGROUND OF THE INVENTION

Field of the Invention

The application relates in general to a containing device, and in particular, to a containing device for affixing a plurality of optical transceivers.

Description of the Related Art

Computers have been widely applied in all fields, and network technologies have progressed rapidly. Therefore, people can easily access information and provide service by way of networks. Due to the enormous data transmission capacity of optoelectronic communication devices, optoelectronic technology seems like a likely candidate for improving transmission quality. The optoelectronics industry, which combines the electronics industry and the optics industry, is currently progressing well. An important device in the optoelectronics industry is an optical module which includes an optical transmitter and an optical receiver, or an optical transceiver combining both functions.

Generally, when an apparatus is in use, a plurality of optical transceivers can be connected thereto. However, when the apparatus or an optical transceiver needs to be maintained or replaced, the user has to manually pull out and insert the optical transceivers one by one. The operation time is therefore increased, and the efficiency of maintenance is reduced. Thus, how to address the aforementioned problem has become an important issue.

BRIEF SUMMARY OF INVENTION

To address the deficiencies of conventional products, an embodiment of the invention provides a containing device connected to a plurality of optical transceivers, wherein each of the optical transceivers comprises a first surface and a second surface opposite to the first surface. The containing device includes a housing and a passage formed in the housing. The passage has a first abutting surface and a second abutting surface. The optical transceivers are disposed in the passage. When the containing device moves along a first direction relative to the optical transceivers, the first abutting surface contacts the first surfaces of the optical transceivers. When the containing device moves along a second direction relative to the optical transceivers, the second abutting surface contacts the second surfaces of the optical transceivers, wherein the first direction is opposite to the second direction.

In some embodiments, the distance between the first abutting surface and the second abutting surface is the same as or greater than the distance between the first surface and the second surface.

In some embodiments, the passage has a Z-shaped structure.

In some embodiments, each of the optical transceivers comprises a main body and a movable portion, when the containing device moves along the second direction relative to the optical transceivers, the containing device pushes the movable portion to move along the second direction relative to the main body.

In some embodiments, the housing comprises a first frame, a base, and at least one fixing member, the passage is formed between the first frame and the base, and the fixing member is extended through the first frame and the base.

In some embodiments, the containing device comprises a plurality of passages, the housing comprises a first frame, a second frame, and a base, and the base is disposed between the first frame and the second frame, wherein at least one passage is formed between the first frame and the base, and at least one passage is formed between the second frame and the base.

In some embodiments, the housing comprises a hole, and the containing device further comprises a stopping member fixed on the housing and extended through the hole, wherein the first abutting surface is formed by the stopping member.

In some embodiments, the housing comprises a hole, and the containing device further comprises a stopping member fixed on the housing and extended through the hole, wherein the first abutting surface is formed by the stopping member.

In some embodiments, the second abutting surface is disposed between the first abutting surface and the elastic member.

In some embodiments, the passage further comprises an inner surface connected to the first abutting surface, wherein the distance between the elastic member and the inner surface is less than or the same as the thickness of each of the optical transceivers.

BRIEF DESCRIPTION OF DRAWINGS

The invention can be more fully understood by reading the subsequent detailed description and examples with references made to the accompanying drawings, wherein:

FIG. 5A is a schematic diagram representing a plurality of optical transceivers inserting into an apparatus by a containing device according to an embodiment of the invention;

FIG. 5B is a schematic diagram representing a first abutting surface of a containing device contacting a first surface of an optical transceiver according to an embodiment of the invention;

FIG. 5C is a schematic diagram representing a second abutting surface of a containing device contacting a second surface of an optical transceiver according to an embodiment of the invention;

DETAILED DESCRIPTION OF INVENTION

The making and using of the embodiments of the containing device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
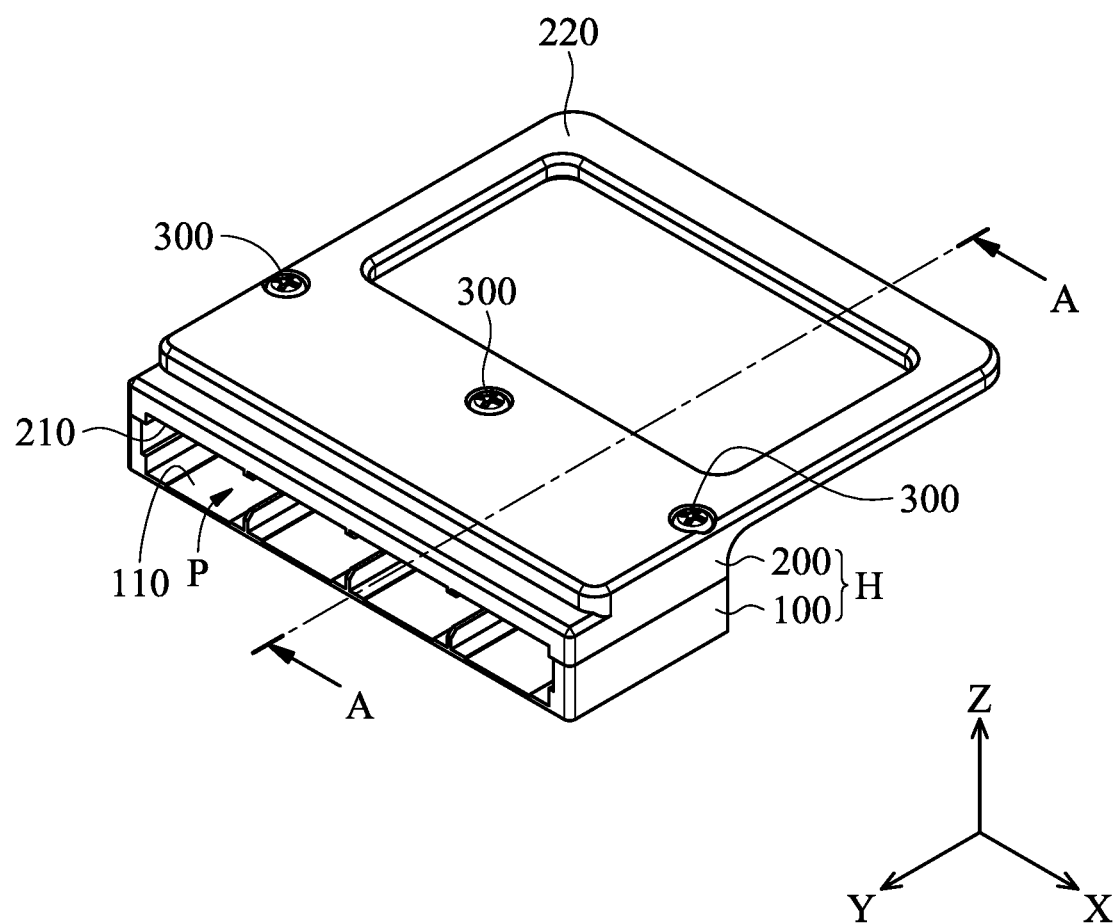
FIG. 1 is a schematic diagram of a containing device according to an embodiment of the invention.
Figure 2:
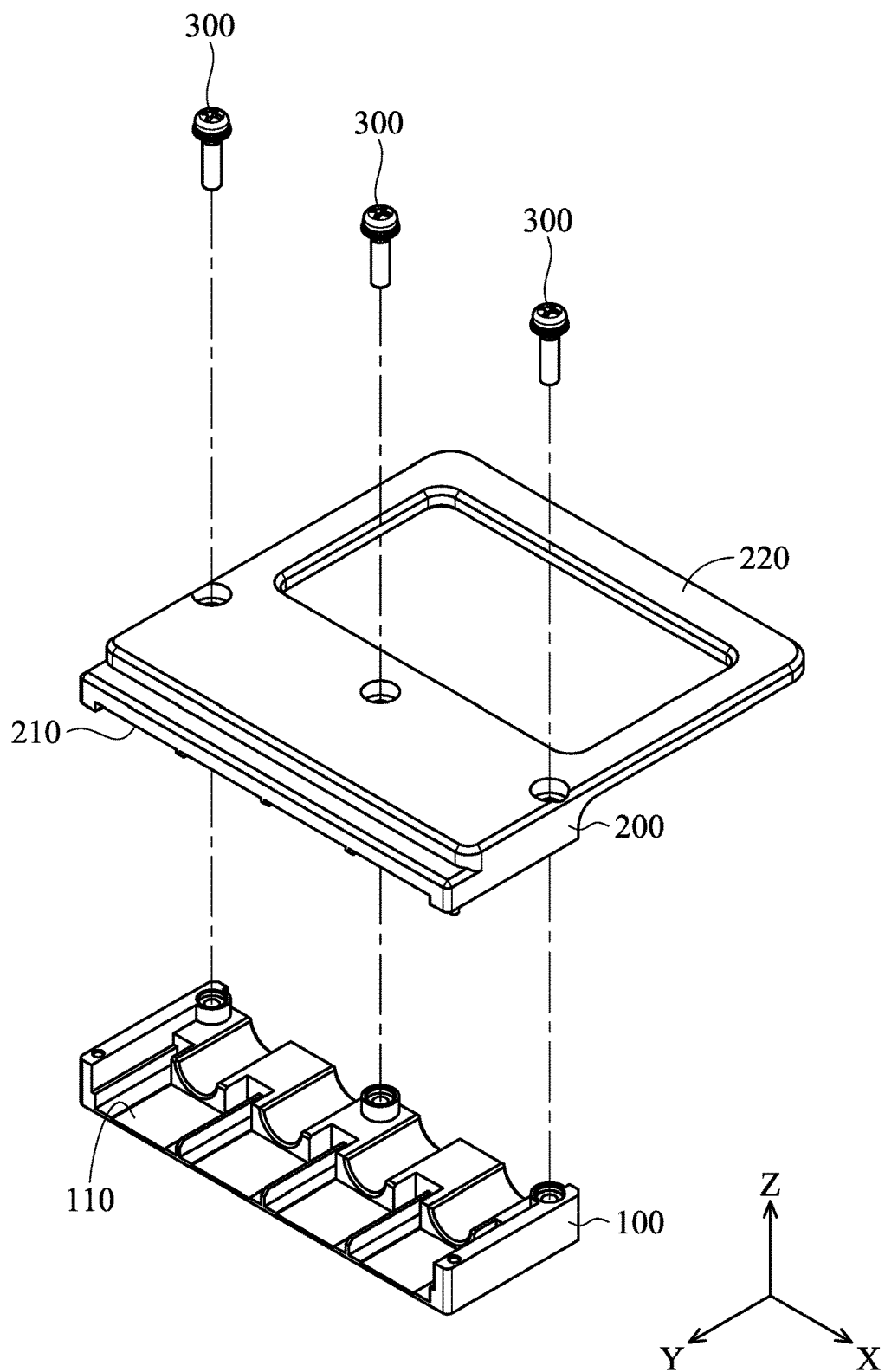
FIG. 2 is an exploded-view diagram of a containing device according to an embodiment of the invention.

Referring to FIGS. 1 and 2, in an embodiment of the invention, a containing device primarily comprises a base 100, a first frame 200, and a plurality of fixing members 300, wherein the fixing members 300 can extend through the first frame 200 and the base 100 to join the first frame 200 with the base 100.

The base 100 has at least one depression portion 110, and the first frame 200 has at least one depression portion 210 and a holding portion 220. When the base 100 and the first frame 200 are joined together by the fixing members 300 and form a housing H, the depression portion 110 of the base 100 corresponds to the depression portion 210 of the first frame 200, and a passage P is formed by the depression portions 110 and 210. The aforementioned passage P is used to accommodate at least one optical transceiver, such as the optical transceiver M shown in FIG. 4.

Figure 3:
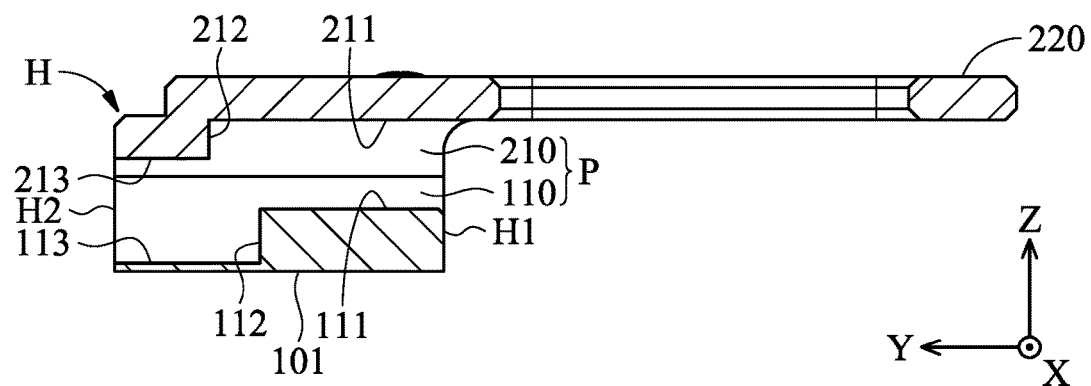
FIG. 3 is a cross-sectional view along the line A-A in FIG. 1.

FIG. 3 is a cross-sectional view along the line A-A in FIG. 1. As shown in FIG. 3, the depression portion 110 has a step-shaped structure, comprising an inner surface 111, a first abutting surface 112, and an inner surface 113. The distance between the inner surface 111 and the bottom surface 101 of the base 100 is greater than that between the inner surface 113 and the bottom surface 101 of the base 100, and the first abutting surface 112 is connected to the inner surface 111 and the inner surface 113. In this embodiment, the inner surface 111 is substantially parallel to the inner surface 113, and the first abutting surface 112 is substantially perpendicular to the inner surfaces 111 and 113.

Similarly, the depression portion 210 has a step-shaped structure, comprising an inner surface 211, a second abutting surface 212, and an inner surface 213. The distance between the inner surface 211 and the bottom surface 101 of the base 100 is greater than that between the inner surface 213 and the bottom surface 101 of the base 100, and the second abutting surface 212 is connected to the inner surface 211 and the inner surface 213. In this embodiment, the inner surface 211 is substantially parallel to the inner surface 213, and the second abutting surface 212 is substantially perpendicular to the inner surfaces 211 and 213.

It should be noted that the inner surface 111 of the depression portion 110 and the inner surface 211 of the depression portion 210 are connected to a side H1 of the housing H, where the holding portion 220 is disposed. The inner surface 113 of the depression portion 110 and the inner surface 213 of the depression portion 210 are connected to the opposite side H2. The length of the inner surface 111 along the Y-axis is less than that of the inner surface 211 along the Y-axis, and the length of the inner surface 113 along the Y-axis is greater than that of the inner surface 213 along the Y-axis. Therefore, the passage P substantially comprises a Z-shaped structure.

Figure 4:
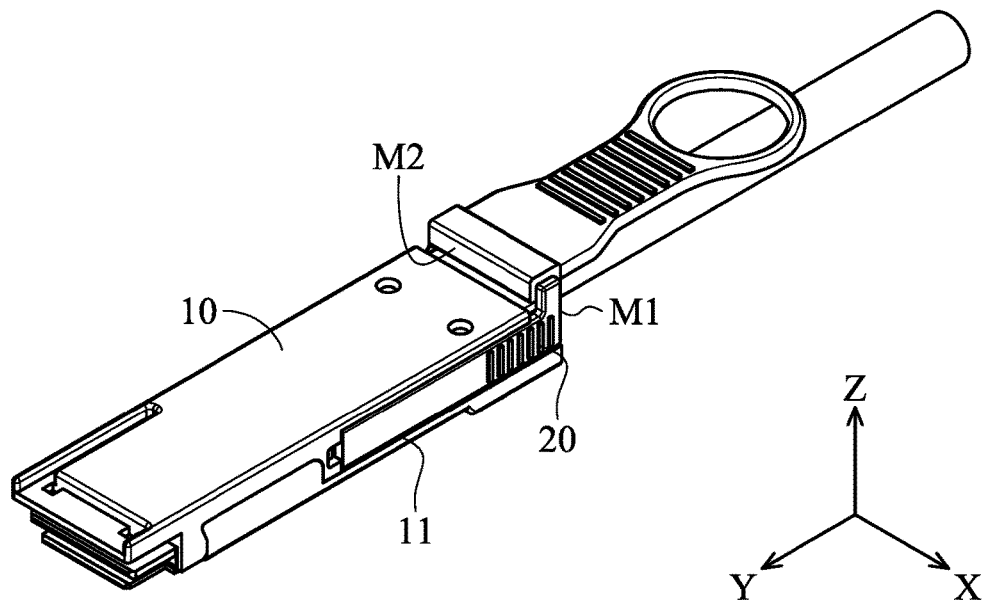
FIG. 4 is a schematic diagram of a general optical transceiver.

Referring to FIG. 4, a general optical transceiver M comprises a main body 10 and a movable portion 20, and the movable portion 20 can be slid along a guiding slot 11 on the main body 10. When the optical transceiver M is inserted into an apparatus (such as an apparatus C shown in FIGS. 5A and 5B), the sheet of the apparatus (not shown) can contact the movable portion 20 and provide elastic force to affix the optical transceiver M. When a user desires to pull out the optical transceiver M from the apparatus C, the user can move the movable portion 20 relative to the main body 10 along the −Y-axis, so as to separate the sheet and the movable portion 20, and the user can smoothly pull out the optical transceiver M.

As shown in FIGS. 5A and 5B, when a plurality of optical transceivers M is desired to insert into and/or pull out from the apparatus C simultaneously, these optical transceivers M can be connected to the aforementioned containing device. In particular, the base 100 and the first frame 200 of the containing device can approach the optical transceivers M respectively from above and below, and the optical transceivers M can be accommodated in the depression portions 110 and 210. Subsequently, the first frame 200 can be affixed to the base 100 by the fixing members 300. Since the appearance of the passage P formed by the depressions 110 and 210 corresponds to the appearance of the optical transceivers M, there is no relative displacement between the optical transceivers M and the housing H in the X-axis and the Z-axis when the optical transceivers M is accommodated in the passage P.

When the user desires to insert the optical transceivers M connected to the containing device into the apparatus C, he can push the containing device along the Y-axis (a first direction). The first abutting surface 112 in the passage P of the containing device contacts the first surfaces M1 of the optical transceivers M, and the optical transceivers M can move along the Y-axis and connect the apparatus C. Therefore, a plurality of optical transceivers M can be inserted into the apparatus C simultaneously.

As shown in FIG. 5C, when the user desires to pull out the optical transceivers M from the apparatus C, the containing device can move along the −Y-axis (a second direction). The second abutting surface 212 in the passage P contacts the second surfaces M2 of the optical transceivers M, and the movable portion 20 moves relative to the main body 10 along the −Y-axis, so as to release the fixing by the sheet in the apparatus C. The second surface M2 is formed on the movable portion 20 of the optical transceiver M and opposite to the first surface M1.

It should be noted that, in this embodiment, the distance between the first abutting surface 112 and the second abutting surface 212 is greater than that between the first surface M1 and the second surface M2 of the optical transceiver M. Thus, the containing device can move relative to the optical transceiver M in the Y-axis. In some embodiments, the distance between the first abutting surface 112 and the second abutting surface 212 is the same as that between the first surface M1 and the second surface M2 of the optical transceiver M.

Figure 6:
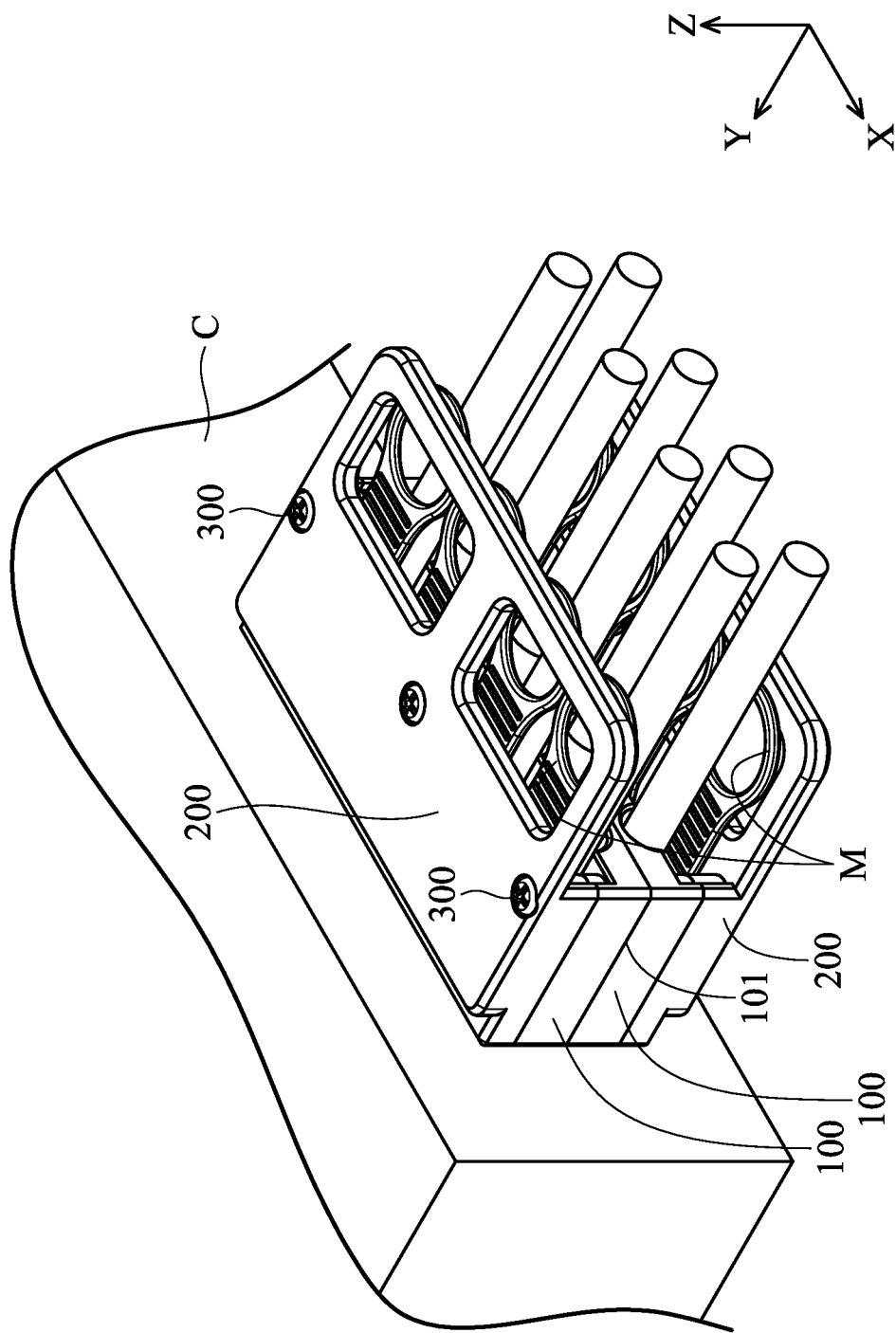
FIG. 6 is a schematic diagram representing a plurality of optical transceivers inserting into an apparatus by a plurality of containing devices according to an embodiment of the invention.

As shown in FIG. 6, since the bottom surface 101 of the base 100 is a flat surface, two containing devices can be arranged symmetrically along the Z-axis without interference.

Figure 7A:
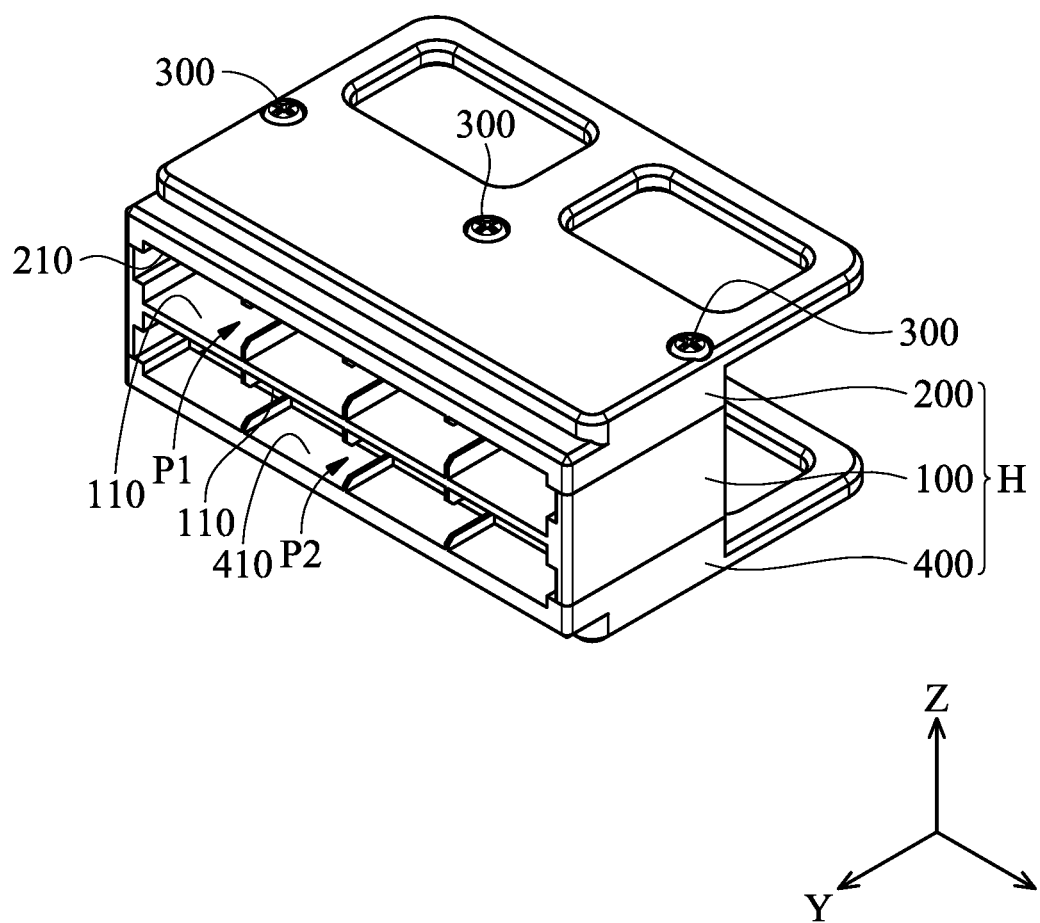
FIG. 7A is a schematic diagram of a containing device according to another embodiment of the invention.
Figure 7B:
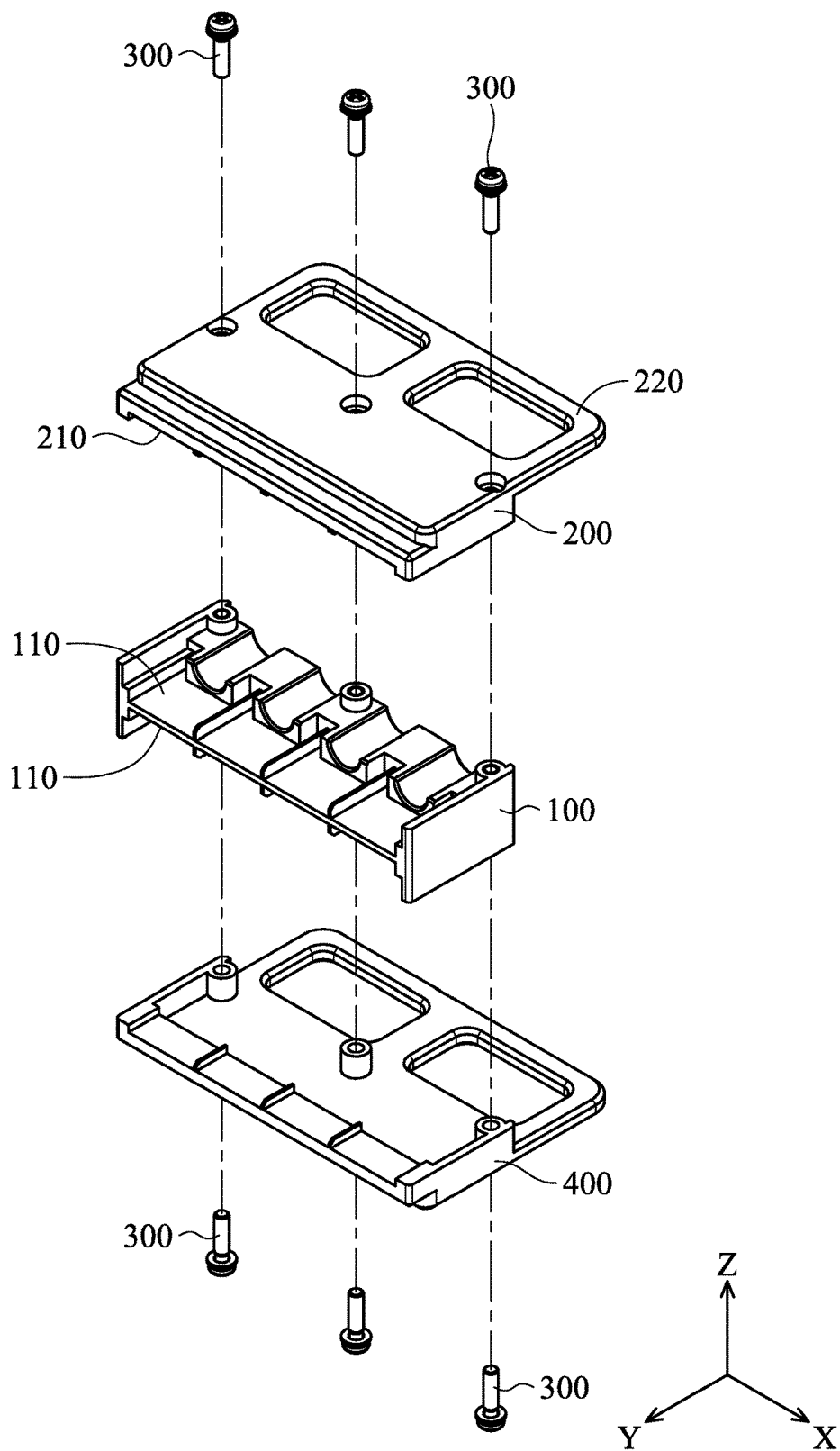
FIG. 7B is an exploded-view diagram of a containing device according to another embodiment of the invention.

As shown in FIGS. 7A and 7B, in another embodiment, the containing device comprises a base 100, a first frame 200, a plurality of fixing members 300, and a second frame 400. The base 100 is disposed between the first frame 200 and the second frame 400, and the depression portions 110 are formed on the opposite surfaces of the base 100, which respectively face the first frame 200 and the second frame 400. The first frame 200 and the second frame 400 respectively has the depression portion 210 and the depression portion 410, and can be affixed to the base 100 by the fixing members 300.

When the base 100 and the first and second frames 200 and 400 are joined together by the fixing members 300 to form a housing H, a passage P1 can be formed by the depression portion 110 on the surface facing the first frame 200 and the depression portion 210, and a passage P2 can be formed by the depression portion 110 on the surface facing the second frame 400 and the depression portion 410. Both the passages P1 and P2 can receive the optical transceiver M. Therefore, more optical transceivers M can be inserted or pulled out simultaneously by the containing device in this embodiment. The structures of the passages P1 and P2 are the same as the structure of the passage P, and the features thereof are not repeated in the interest of brevity.

Figure 8A:
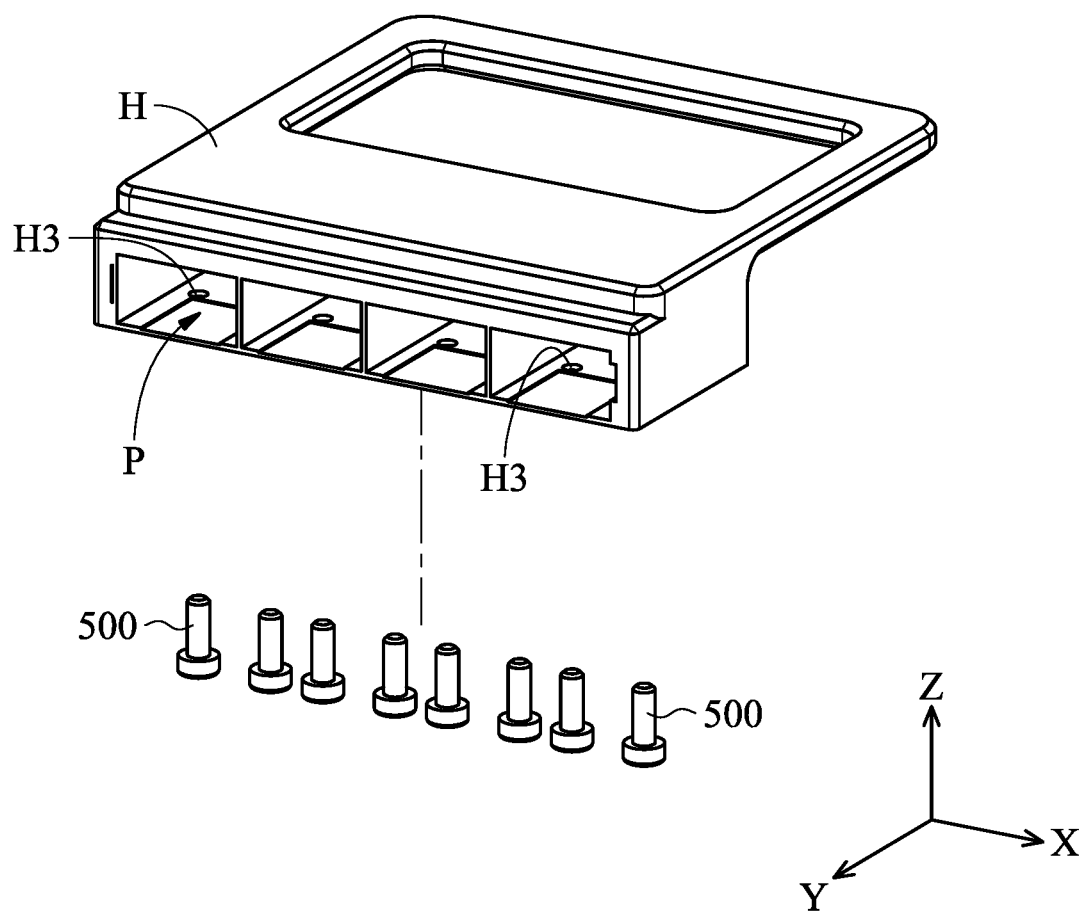
FIG. 8A is an exploded-view diagram of a containing device according to another embodiment of the invention.
Figure 8B:
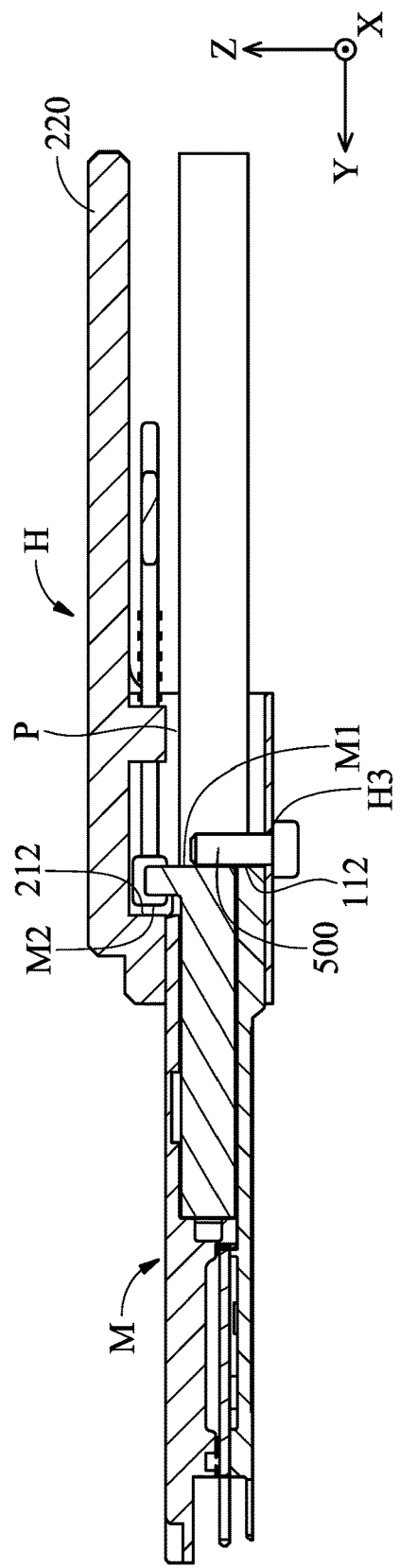
FIG. 8B is a schematic diagram representing an optical transceiver disposed in a containing device according to another embodiment of the invention.

As shown in FIGS. 8A and 8B, in another embodiment, the containing device comprises a housing H and a plurality of stopping members 500, wherein the housing H has at least one passage P and a plurality of holes H3, and the holes H3 are communicated with the passage P. When assembled, the optical transceiver(s) M can firstly enters the passage P, and the stopping members 500 can pass through the hole H3 and be affixed to the housing H. Since the stopping members 500 protrude from the inner wall of the passage P and form the first abutting surface 112 in the passage P, the optical transceivers M can be also inserted or pulled out simultaneously by the containing device in this embodiment.

Figure 9:
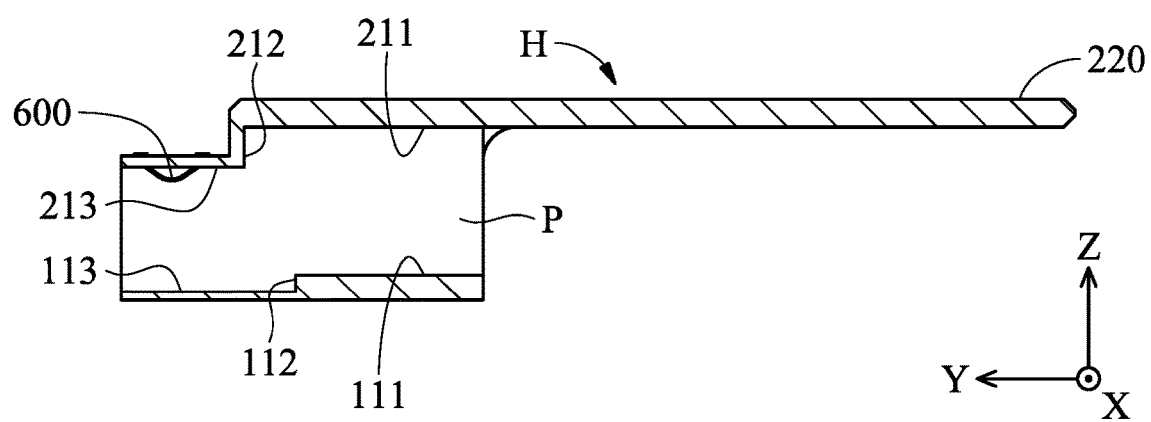
FIG. 9 is a schematic diagram of a containing device according to another embodiment of the invention.

Referring to FIG. 9, in another embodiment, the containing device can comprise an elastic member 600 disposed on the inner surface 213 of the passage P, wherein the second abutting surface 212 is disposed between the first abutting surface 112 and the elastic member 600. The distance between the elastic member 600 and the inner surface 113 is less than the thickness of the optical transceiver M. Therefore, when the optical transceiver M is accommodated in the passage P, the elastic member 600 can provide an elastic force to affix the optical transceiver M.

Specifically, the housing H of the containing device in the embodiments of FIGS. 8A, 8B and 9 can be integrally formed as one piece. Thus, the fixing members 300 can be omitted, so as to reduce the number of assembly steps and the assembly time.

In summary, a containing device connected to a plurality of optical transceivers is provided, wherein each of the optical transceivers comprises a first surface and a second surface opposite to the first surface. The containing device includes a housing and a passage formed in the housing. The passage has a first abutting surface and a second abutting surface. The optical transceivers are disposed in the passage. When the containing device moves along a first direction relative to the optical transceivers, the first abutting surface contacts the first surfaces of the optical transceivers. When the containing device moves along a second direction relative to the optical transceivers, the second abutting surface contacts the second surfaces of the optical transceivers, wherein the first direction is opposite to the second direction. The optical transceivers can be inserted into and/or pulled out from the apparatus by the aforementioned containing device, so as to reduce the operation time in usage, inspection or maintenance.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A containing device for affixing a plurality of optical transceivers, wherein each of the optical transceivers comprises a first surface and a second surface opposite to the first surface, and the containing device comprises:

a housing; and at least one passage, formed in the housing and comprising a first abutting surface and a second abutting surface, wherein the optical transceivers are disposed in the passage, wherein when the containing device moves along a first direction relative to the optical transceivers, the first abutting surface contacts the first surfaces of the optical transceivers, and when the containing device moves along a second direction relative to the optical transceivers, the second abutting surface contacts the second surfaces of the optical transceivers, wherein the first direction is opposite to the second direction, wherein the distance between the first abutting surface and the second abutting surface is the same as or greater than the distance between the first surface and the second surface.

2. The containing device as claimed in claim 1, wherein the passage has a Z-shaped structure.

3. The containing device as claimed in claim 1, wherein each of the optical transceivers comprises a main body and a movable portion, when the containing device moves along the second direction relative to the optical transceivers, the containing device pushes the movable portion to move along the second direction relative to the main body.

4. The containing device as claimed in claim 1, wherein the housing comprises a first frame, a base, and at least one fixing member, the passage is formed between the first frame and the base, and the fixing member is extended through the first frame and the base.

5. The containing device as claimed in claim 1, wherein the containing device comprises a plurality of passages, the housing comprises a first frame, a second frame, and a base, and the base is disposed between the first frame and the second frame, wherein at least one passage is formed between the first frame and the base, and at least one passage is formed between the second frame and the base.

6. The containing device as claimed in claim 1, wherein the housing comprises a hole, and the containing device further comprises a stopping member fixed on the housing and extended through the hole, wherein the first abutting surface is formed by the stopping member.

7. The containing device as claimed in claim 1, wherein the containing device further comprises an elastic member disposed in the passage.

8. The containing device as claimed in claim 7, wherein the second abutting surface is disposed between the first abutting surface and the elastic member.

9. The containing device as claimed in claim 7, wherein the passage further comprises an inner surface connected to the first abutting surface, wherein the distance between the elastic member and the inner surface is less than or the same as the thickness of each of the optical transceivers.

* * * * *